Nov. 12, 1963    L. E. LEGG    3,110,463
LOCKED WHEEL DETECTOR FOR USE ON RAILROADS
Filed March 2, 1956    3 Sheets-Sheet 2

INVENTOR.
L. E. LEGG
BY
Forest B. Hitchcock
HIS ATTORNEY

Nov. 12, 1963    L. E. LEGG    3,110,463
LOCKED WHEEL DETECTOR FOR USE ON RAILROADS
Filed March 2, 1956    3 Sheets-Sheet 3

INVENTOR.
L. E. LEGG
BY
Forest B. Hitchcock
HIS ATTORNEY

3,110,463
LOCKED WHEEL DETECTOR FOR USE ON
RAILROADS
Lawrence E. Legg, 1040 N. Waller St., Chicago, Ill.
Filed Mar. 2, 1956, Ser. No. 569,080
6 Claims. (Cl. 246—246)

This invention relates to a locked wheel detector for use on railroads; and more particularly pertains to an organization and structure located along the trackway for detecting a hard rolling or locked wheel of a train and giving an indication of such condition.

It has been proposed to provide apparatus on locomotives for detecting the wheel slide or slip under various conditions; but such a system is not practical for application to every car of a train. Yet, the sliding of a wheel of any car of a train may be just as dangerous and result in just as costly accidents as in the case of the sliding wheels of a locomotive. For this reason, the present invention proposes to provide a structure and organization for detecting hard rolling wheels and/or those that are actually sliding with suitable indication of such condition to provide an organization to avoid costly accidents.

Wheels are caused to be hard rolling due to various conditions such as a dry bearing, a hot box, a defective roller bearing, an unreleased brake, or the like. Sometimes a defective bearing will result in the journal being burned off allowing the wheel to be displaced and causing a derailment. In other cases, as a wheel slides, it becomes flattened and the flange becomes longer and longer so that it projects far beyond the proper position of a wheel flange. Such projecting flange may reach out sufficiently to engage an open switch point and cause the switch to be erroneously thrown under the wheels of the train and cause it to be derailed. Various conditions can take place with regard to any car of a train, and for such reason I propose that my detector shall be located in the trackway to check all of the wheels of every train passing over it.

Generally speaking, and without attempting to define the exact nature and scope of the invention, it is proposed to provide a locked wheel detector structure along the trackway in the form of a section of "floating rail." More specifically, it is proposed that a short section of rail be mounted on suitable rollers so as to be biased by resilient means to a central position with sufficient force that such position is maintained while a train is rolling over such rail section under normal conditions, but when a wheel is rolling hard or sliding, there is sufficient force applied to the "floating rail" section as to move it in the direction of train movement and actuate suitable contacts for controlling a signal to indicate such condition to the trainmen.

It is proposed in accordance with the present invention to provide a simple detecting structure that can be used in two different organizations, each accomplishing the major purposes of the invention but with different degrees of sensitivity. One organization provides that a "floating rail" section will be located in only one of the two rails of a trackway; while the other organization provides that a "floating rail" section will be located in both of the rails of a trackway and exactly opposite each other.

The first organization just mentioned provides that with the usual solid connection of an axle between each pair of wheels, the normal rolling wheels will pass over the detector without any sliding action. This is because the friction between one wheel on solid track will be sufficient to overcome the forces of regular bearing friction, generators, and the like, for both wheels of a pair. In other words, this arrangement is particularly for detecting wheels which are actually sliding to some extent or are fully locked in one position.

The other organization provides that both wheels of a given axle are on "floating rail" sections at the same time. Thus, the biasing means for the two "floating rail" sections is so designed as to be sufficient to overcome the usual bearing frictions and generator loads but effective to provide an indication if such load rises beyond a predetermined point. In other words, this organization of the elements of the present invention provides a more highly sensitive detector, although it obviously would be subject to the selection of proper margins for operation.

In connection with both general organizations of the elements of the present embodiment, it is contemplated that suitable means will be located adjacent the trackway to mark each wheel of a car or train that has actuated the detector. In addition, it is also proposed to provide a signal for advising the engineer of such a train of the condition detected, and such signal is controlled that it requires a trainman to restore the signal. It may also be desirable to have an indication of the number of actuations of the detector so that a trainman in looking for the trouble will be advised as to how far he must inspect the train.

Other objects, purposes and characteristic features of the present invention will be in part obvious from the accompanying drawings, and in part pointed out as the description of the invention progresses.

In describing the invention in detail, reference will be made to the accompanying drawings, in which like reference characters designate corresponding parts throughout the several views, and in which.

Figure 1:
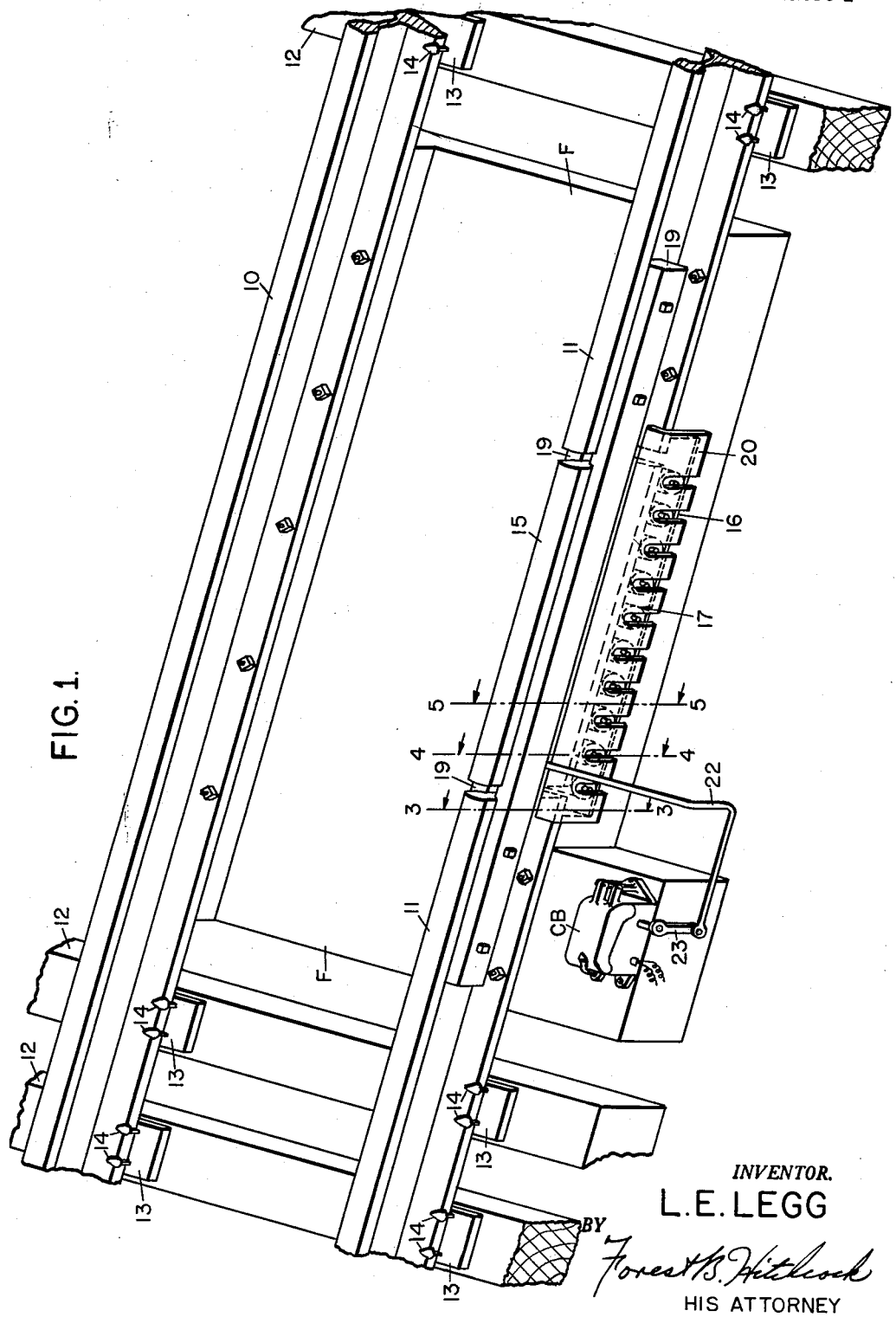
FIG. 1 is a general layout of the structure embodying the present invention, where a "floating rail" section is located in only one track of a trackway.
Figure 3:
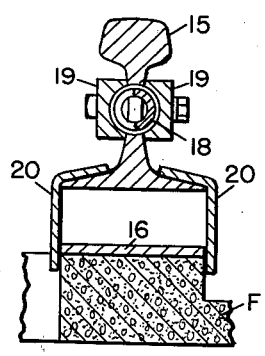
Figure 4:
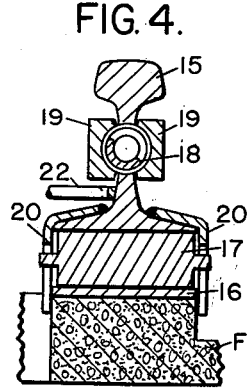
Figure 5:
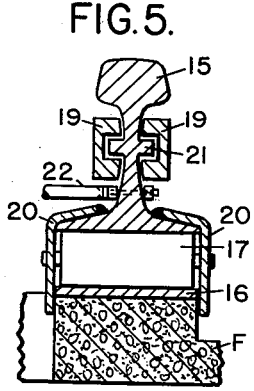
Figure 6:
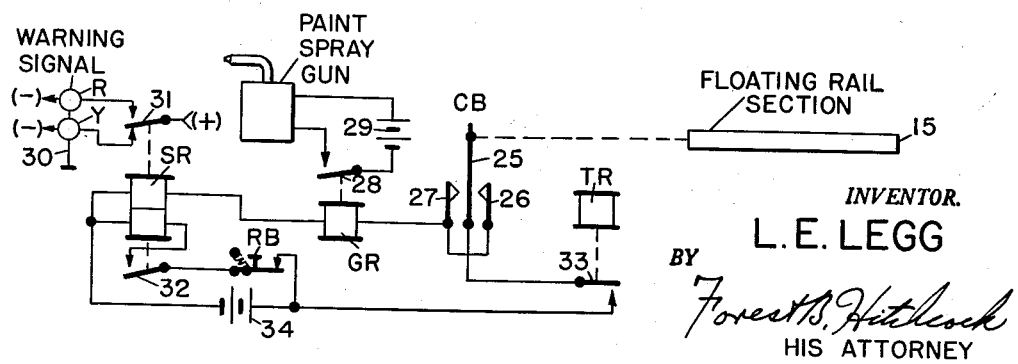
Figure 7:
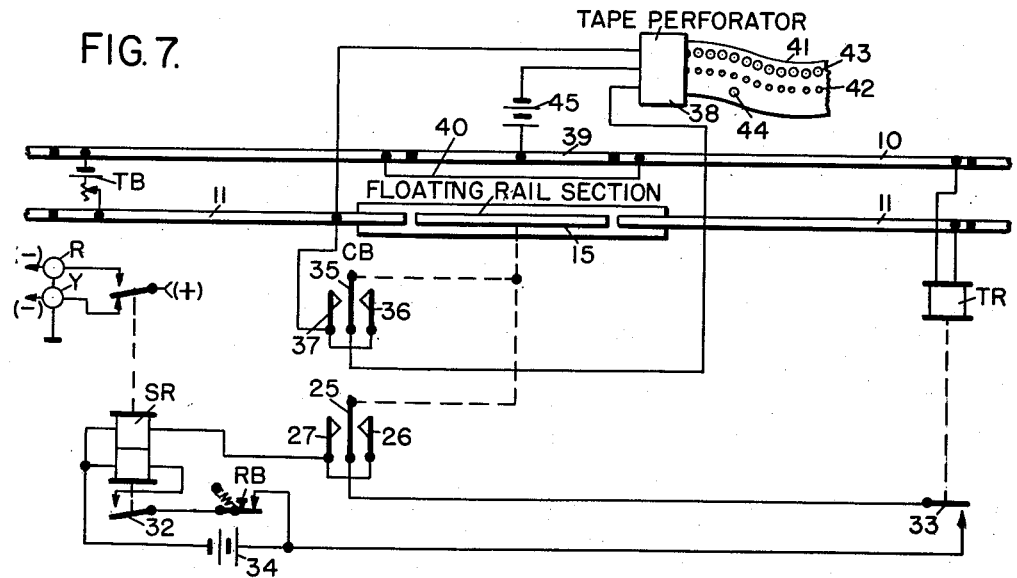
Figure 8:
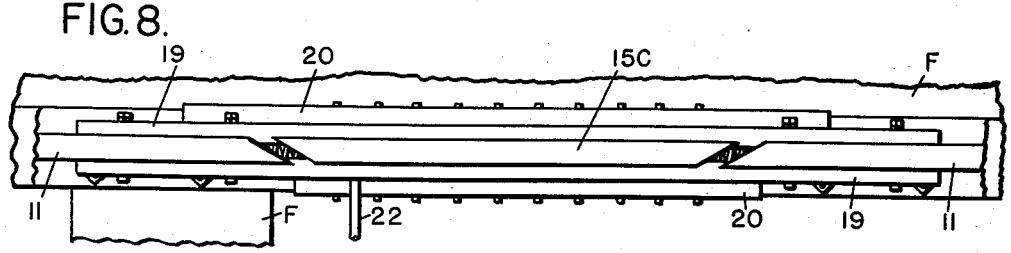
Figure 9:
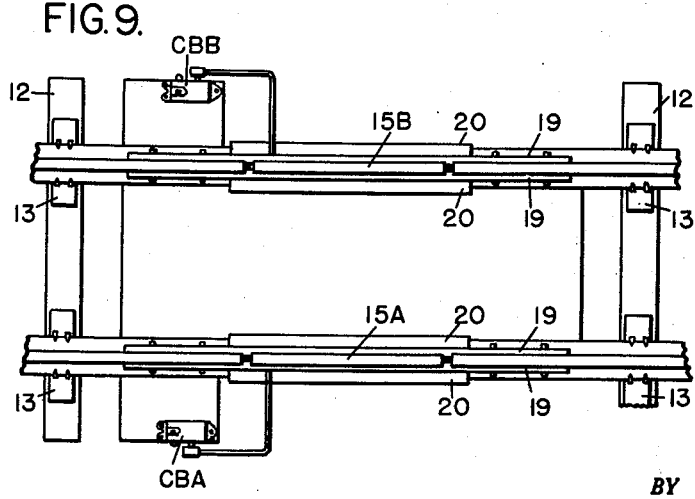

FIG. 3 is a sectional view taken on line 3—3 of FIG. 1;
FIG. 4 is a sectional view taken on line 4—4 of FIG. 1;
FIG. 5 is a sectional view taken on line 5—5 of FIG. 1;

FIG. 6 is a diagrammatic circuit organization to illustrate the control of a warning signal and one marking means that may be employed in connection with the present invention;

FIG. 7 is a diagrammatic circuit organization to illustrate the control of the warning signal and the provision of a recording means that may be employed in connection with the present invention to indicate the particular wheels of a train that may have caused an indication;

FIG. 8 is a modified form of FIG. 1 to provide more smooth entrance of a wheel onto the "floating rail" section; and FIG. 9 is a diagrammatic view to illustrate the organization of the present invention where two "floating rail" sections are located immediately opposite each other.

For the purpose of simplifying the illustration and facilitating the explanation, the various parts and circuits constituting the embodiment of the invention have been shown diagrammatically and certain conventional illustrations have been employed, the drawings having been made more with the purpose of making it easy to understand the principles and mode of operation, than with the idea of illustrating the specific construction and arrangement of parts that would be employed in practice. Thus, the various relays and their contacts are illustrated in a conventional manner, and symbols are used to indicate connections to the terminals of batteries, or other source of electric current, instead of showing all of the wiring connections to these terminals. In some instances, battery symbols have been employed, and in others the symbols (+) and (—) are employed to indicate the positive and negative terminals respectively of suitable sources of electric current.

Referring to FIG. 1, two rails 10 and 11 of a trackway are shown as supported by the usual wood ties 12. These rails 10 and 11 have the usual tie plate 13 and rail spikes 14 for holding the rails in position.

In accordance with the present invention, a portion of these two rails 10 and 11 is supported by a suitable foundation F preferably made of reinforced concrete to which the rails 10 and 11 are suitably fastened by lug bolts. The purpose of this foundation is to minimize the flexure of the rails during the passage of cars and to maintain a stability which is not obtainable with the usual wooden ties.

The rail 11 has a section removed to provide for the insertion of a "floating rail" section constructed in accordance with the present invention. This "floating rail" section comprises in general, a movable rail 15, a steel track 16, supporting rollers 17, biasing springs 18, and guide bars 19.

Figure 2:
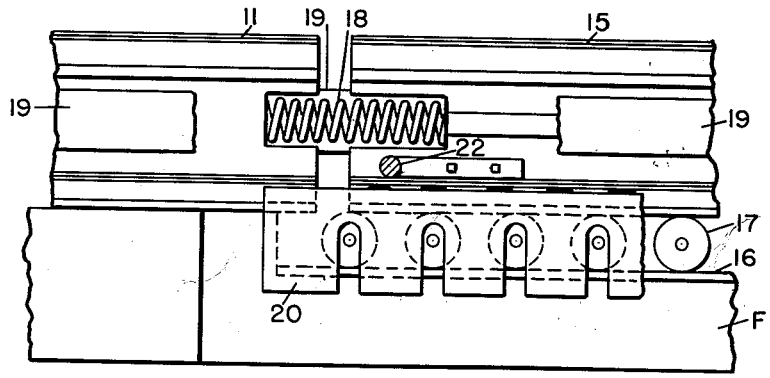
FIG. 2 is an enlarged portion of one end of the "floating rail" section of FIG. 1 with certain parts broken away to illustrate the biasing means for the "floating rail" section.

Referring to FIGS. 2 and 3, it will be noted that the foundation F has a depressed portion beneath the "floating rail" section into which the flat steel track 16 is inserted and is held in position by the ends of the recess in the foundation. The rollers 17 are made of suitable hardened steel for supporting the lower surface of the floating rail 15 which of course has been smoothed by suitable grinding.

The rollers 17 are spaced and held in position by the side plates 20 which have slotted openings for receiving the extending axles of the rollers. These side plates 20 are suitably welded to the floating rail section as indicated in FIGS. 2, 4 and 5, and serve not only to guide the rollers 17 but also to protect them from dirt and the like.

When the floating rail section is assembled into position, the coil springs are inserted in a notched portion both in the floating rail section and in the main rail 11. Then the guide bars 19, one on either side of the rails, are bolted into position. These guide bars 19 have a slotted portion substantially throughout their length for receiving extending ribs 21 attached to each side of the floating rail section. This can be best seen in FIG. 5 which is a section taken on line 5—5 of FIG. 1. In this way, the floating rail section is firmly guided to prevent undue horizontal or vertical movement although left free for longitudinal movement.

FIG. 2 is a partial view of FIG. 1 taken at the point where the floating rail section 15 joins with the main rail 11 and the outside guide bar 19 has been partially removed to show the biasing spring in its position. Cross-sectional views of FIGS. 3 and 4 show how the guide bars 19 have recesses for receiving the biasing springs 18; and these recesses are at the ends of the slotted portions above mentioned.

Also, attached to the floating rail section 15 is a connecting rod 22 which is suitably formed to connect with the crank arm of a contactor box CB (see FIG. 1). This contactor box may be of any suitable design, but it is arranged to close contacts whenever the floating rail section is moved within certain limits from its central biased position as hereinafter discussed. For the sake of definiteness in the present disclosure, it is assumed that the contacting box CB is constructed similar to a regular switch box such as disclosed in the prior patent of J. E. Stephenson, Patent No. 2,394,215, granted February 5, 1946. Such a contactor provides for the positive closure of contacts if there is movement of its crank arm more than a predetermined amount, such contacting operation being abruptly performed. For the purposes of illustration, it is convenient to show the connecting rod 22 arranged to connect with the crank arm 23 of the contacting box CB as shown in FIG. 1, but it should be understood that other arrangements could be employed so as to limit the length and simplify the contour of the connecting rod 22.

From the above description, it will be apparent that the floating rail section 15 is biased to a mid position by the biasing springs 18, one located at each end of the floating rail section 15. These springs will have suitable degrees of resiliency as required for the conditions of practice. As later discussed, these conditions will be different, however, when the organization of FIG. 1 is employed than when the organization of FIG. 9 is employed. In either case, the floating rail section 15 is in a mid position from which it may be actuated by a hard rolling wheel in one direction or the other depending on the direction of train movement; and the contacts of the contactor box CB are arranged to be normally opened and closed when the floating rail section 15 is moved in either direction more than a predetermined amount. Although FIGS. 6 and 7 are more particularly arranged to illustrate the indication of the operation of the floating rail section for one direction of traffic, it is apparent that the organization can be arranged to give a warning signal for either or both directions of traffic.

One aspect in practicing the invention is that the detector should be properly located with respect to the physical characteristics of the trackway. Preferably, the detector should be located on level track. Also, it would be desirable to have the location clear of grade road crossings; and in some instances, it may be desirable to have the location near an interlocking plant, where an attendant on duty could assist in watching the signal indication, recording mechanisms, and resetting of the signal, and the like.

Also, the manner in which a train is run over the detector is of significance. More specifically, the engineer must notch his throttle back to the "idle" position while the locomotive passes over the locked wheel detector. This is so as to prevent a false indication being given by reason of the application of power. Similarly, the engineer must not use either dynamic brakes on the locomotive or apply the air brakes to the train. Either would give a false indication. Obviously, as soon as the locomotive has passed beyond the detector, the engineer may then proceed to either apply power or dynamic braking; but he would have to refrain from applying the air brakes to the cars constituting a train until the entire train has passed over the detector, otherwise a false indication would be given.

It is for these reasons with regard to the application of brakes that it is desirable to provide a location for the detector away from highway crossings, or like situations, which might require the application of the brakes.

In the organization of FIG. 1, as previously mentioned, it is assumed that the detector 15 will be operated by any wheel which is slipping or sliding with regard to the surface of the rail heads. More specifically, while any particular wheel is on the floating rail of the detector, its companion wheel at the other end of the axle is on the regular rail 10 which would provide sufficient rolling friction to drive both wheels and their axle loads; but when the bearings or brakes or other conditions cause undue hard turning, then the rolling friction on rail 10 is insufficient to prevent a sliding action with regard thereto, so that the wheel then on the floating rail section 15 has sufficient adherence thereto to cause the movement of the floating rail section 15 in the direction of train movement and thus actuate the contacts of the contact box CB.

For this organization, the springs 18 must provide sufficient biasing pressure to center the floating rail section 15, and yet be sufficiently resilient as to allow an undue drag to move it. Also, it is believed that the head of the floating rail section 15 should be a few thousandths lower than the head of the rail 11 so as to prevent undue impact on the floating rail upon the entrance of a normally rolling wheel. Such entrance impact can be reduced in various ways such as suggested in the modification of FIG. 8, where the ends of the floating rail section 15C are on an angle rather than at right angles as shown in FIG. 1. This provides that the head of the main rail 11 still supports the entering wheel as it begins to be supported by the floating rail section 15C. This modification of FIG. 8 is merely to illustrate that the present invention contemplates the practice of suitable structures to effect the practicability of the present invention.

When the organization of FIG. 9 is employed, the biasing springs 18 at each end of the floating rail section will have to be heavier than for the organization shown in FIG. 1 since the biasing springs will have to oppose the usual drag of the bearing friction of axles and the load imposed thereupon by the provision of axle generators for pullman cars and the like. The usual axle driven generators do not produce more than 30 kilowatts of energy at the usual running speeds of trains. Some drives provide for a ratio of 1 to 3.09 whereas others provide for a ratio of 1 to 2.54. The overall efficiency of such an organization may be in the order of 75%. In any event, these loads and the practical rolling resistance of the usual bearings encountered will have to be opposed by the springs 18 and their resiliency will have to be selected accordingly. In this connection, it is proposed that springs of different resiliency may be provided and readily substituted one for the other to meet the particular conditions of practice found on any particular railroad.

Referring to FIG. 6, it is noted that the contact box CB is illustrated as having a movable contact 25 which is operated between two fixed contacts 26 and 27 by the right or left-hand movement of the floating rail section 15. Thus, any movement of the floating rail section beyond predetermined limits from a mid position, such as three-sixteenths of an inch, for example, will cause the movable contact 25 to abruptly contact either contact 26 or contact 27 depending upon the direction of train movement. A paint spray gun is shown in FIG. 6, which may be suitably located adjacent the floating rail section so that when the spray gun is actuated by the closure of front contact 28 of gun relay GR, the battery 29 supplies energy to actuate the gun and cause a spray of paint. It is assumed that this spray gun is relatively quick acting and is so located that its spray will mark the wheel which has caused the actuation (or movement) of the floating rail section 15. In this connection, the relay GR should also be quick acting in its characteristics.

A warning signal 30 is preferably located at some distance beyond the detector so as to allow an entire train to move over the detector before the engineer stops such train in response to an indication. Merely by way of illustration, this signal 30 is shown as having a normally illuminated yellow lamp Y and a red lamp R, which red lamp R is illuminated when the floating rail section has been moved beyond its predetermined limits. The signal relay SR is provided with a contact 31 for controlling the energy to the warning signal 30. It also has a front contact 32 which is included in a stick circuit having a release button RB. It is assumed that the slip detector is located in a track section having the usual track circuit and track relay TR. Whenever such track section is occupied, the track relay TR is of course deenergized and its back contact 33 prepares the circuit for energization of relays GR and SR in the event some wheel of the train is slipping or is hard rolling and causes the actuation of the floating rail section 15. Such actuation of movable contact 25 then completes the circuit through contact 26 or 27 to allow energy to flow from battery 34 through the gun relay GR, the signal relay SR to energize both of these relays. The temporary energization of the relay SR completes the stick circuit including front contact 32 and release button RB so that this relay SR is maintained picked up causing the illumination of the red lamp R of signal 30 through front contact 31, until the trainman stops at such signal and actuates the release button RB.

However, it should be noted that the momentary actuation of the contact 25 by the floating rail section only temporarily energizes the gun relay GR. Such actuation is effective to mark the wheel passing over the floating rail section and causing its actuation, but as soon as that wheel has passed and the floating rail section again assumes its mid position, the relay GR is dropped away so that the paint spray gun does not mark any normally rolling wheels. On the other hand, if a second, third, or other wheels in the train should be hard rolling the gun would be actuated and would mark such wheels. In other words, the paint spray gun is actuated only for the hard rolling wheels; whereas, if one hard rolling wheel actuates the relay SR, it is maintained actuated regardless of the absence of other hard rolling wheels in the train.

When the train stops to inspect the wheels that have been marked as being hard rolling wheels, the trainman will actuate the release button RB so as to release the relay SR and extinguish the warning lamp R. This allows the yellow lamp Y to be illuminated and restores the complete detecting organization in readiness for a subsequent train.

If the floating rail section is to be used for detecting trains for both directions of traffic, then two signals such as 30 may be employed, one for each direction of traffic, suitably located with respect to the floating rail section. Under such circumstances, it may be desirable to provide separate signal relays SR and separate release buttons RB, and each relay can be controlled by the appropriate contact 26 or 27 as the case may be so that only the appropriate signal will indicate the presence of a hard rolling car wheel.

In some circumstances of practice, it may be desirable to provide a record of the wheel conditions rather than merely marking them. In other cases it may be desirable to do both. For convenience in the illustration of FIG. 7, the paint spray gun marking means has been omitted, but it is to be understood that it could be used in the organization of FIG. 7 if desired.

In FIG. 7, the rails 10 and 11 have been shown as comprising the rails of a track circuit including the track relay TR and the track battery TB. The contactor box CB is shown as having the same contacts 25, 26 and 27 as shown in FIG. 6, and they control the signal relay SR with its associated release button RB in exactly the same way as previously described. However, the contactor box CB is additionally shown as having contacts 35, 36 and 37 which are operated in the same way as the contacts 25, 26 and 27, but they control a tape perforator 38 to make a record of the passage of the wheels of a train.

To accomplish this, the rail 10 is shown as having a short insulated section 39 of a length comparable to the length of the floating rail section 15. The length of each of these sections is contemplated as being in the order of 18 to 24 inches. A bond 40 is connected around the rail section 39 so as to provide continuity for the track circuit including the track relay TR. The tape perforator 38 is provided with the usual advancing magnet and also with a punch for punching the paper tape each time it is advanced. Referring to the paper tape 41, it can be seen that the advancing perforations 42 are located at the center of the tape; whereas, the perforations 43 indicate that the tape has been advanced by actuation of the advancing magnet. After a record has been made and the tape manually pulled out to provide a proper place for tearing it off, there will be no perforations such as 43 in the pulled out portion of the tape.

The tape perforator 38 is provided by another magnet for punching holes on the lower side of the paper tape 41 each time such magnet is actuated, but it is controlled by the contacts 35, 36 and 37 so as to be actuated only when a yard rolling wheel causes the actuation of the floating rail section 15. For example, the punched hole 44 indicates that the eighth wheel from the front of the train has been hard rolling and has caused the actuation of the floating rail section 15.

A suitable source, such as battery 45, is connected to the rail section 39 and to a mid position of the tape perforator 38. The advancing magnet of the perforator is connected to the rail 11. Thus, each time a pair of wheels connected by a solid axle passes over the sections 15 and 39, a circuit is completed for energizing the advancing magnet of the perforator. At the same time, a circuit is prepared by the shunting wheels to energize the hard rolling wheel recording magnet if the rail section 15 is moved by such wheel because of its hard rolling characteristics to thereby actuate the movable contact 35. In this way the tape perforator 38 records the number of wheel axles passing over the sections 15 and 39 and clearly provides a record as to which of them, if any, had been hard rolling.

Since the sections 15 and 39 are relatively short, the other wheels and their respective axles will maintain the shunted condition of the track circuit including the track relay TR so that at the same time the slide recording magnet of the tape is actuated, the signal relay SR will also be energized. When the train stops at the signal and releases the relay SR by actuating the button RB, the trainman at the same time can withdraw the necessary amount of tape 41 and tear it off. This gives him a record of the wheels of his train, and he can easily identify which wheels have been the faulty ones and caused the record of a hard rolling characteristic.

Referring to FIG. 8, it has previously been mentioned how the floating rail section 15C has been here illustrated as having oblique ends so as to provide a smoother approach for the wheels without any impact that might otherwise cause the false actuation of the floating rail section.

FIG. 9 illustrates the modification of the organization previously discussed where two floating rail sections 15A and 15B are located in the two rails opposite each other. They each are provided with their contact boxes CBA and CBB. Either of the circuit organizations shown in FIG. 6 or in FIG. 7 may be employed with FIG. 9. All that is required is that the contact boxes CBA and CBB have their contacts connected in multiple. If this organization employs the circuits of FIG. 7, then one of the floating rail sections needs to be insulated from the track proper, or some form of treadle or track instrument may be employed if desired.

Having described a hard rolling or wheel slip detector as a specific embodiment of the present invention, it is desired to be understood that this form is illustrated to facilitate in the disclosure of the invention rather than to limit the number of forms which it may assume; and, it is to be further understood, that various modifications, adaptations and alterations may be applied to the specific form shown to meet the requirements of practice, without in any manner departing from the spirit or scope of the present invention.

What I claim is:

1. A device for detecting the hard rolling characteristics of a railway car wheel, comprising a length of railroad track having two parallel rails, one rail of said track having a section removed therefrom, a short floating rail section inserted in the space provided by said removed section and aligned to provide for the smooth movement of train wheels over the trackway, the ends of said one rail adjacent opposite ends of said floating section being formed on an oblique angle with respect to the longitudinal axis of the main rail, said opposite ends of the floating rail section being formed on a complementary oblique angle to match the ends of said one rail, the length of said floating rail being foreshortened sufficiently to permit a limited movement of the floating rail section in a longitudinal direction, guide bars located one on each side of said floating rail section and firmly attached to and adjacent the ends of said main rail, resilient means operatively positioned between the floating rail section and each adjacent end of said main rail to urge constantly said floating rail section to a first position relative to said main rails and effective to cause said rail to move longitudinally to another position in response to the frictional force of a hard rolling wheel traversing said floating section, and means secured to and responsive to movement of the floating rail section for indicating the movement of said floating rail section to said other position.

2. A device for detecting hard rolling characteristics of the wheels of railway cars, comprising a length of railroad track having two parallel rails, one rail of said track having a section removed therefrom to provide a space for mounting a short section of test track in alignment with said one rail, a section of test track positioned in the space between adjacent ends of said one rail and in alignment therewith, the length of said test track being foreshortened sufficiently to permit a limited longitudinal movement of said section, guide means secured to said test track and movable therewith to include portions of the ends of said main rail during the limited longitudinal movement to maintain said main rail and said test track in alignment, bearing means operatively mounted beneath said test track effective to support said section and to permit relatively frictionless limited longitudinal movement of said section, resilient means operatively positioned between the section of test track and each adjacent end of said main rail to urge constantly said test track to a first position in said space and effective to cause said test track to move longitudinally a predetermined distance from said first position in response to the frictional force of a hard rolling wheel when the wheel is traversing said test track, and means secured to and responsive to movement of the section of test track for indicating the movement of said test track a predetermined distance.

3. A device as claimed in claim 2 wherein said resilient means are coil springs.

4. A device as claimed in claim 2 wherein said bearing means are rollers having projections extending outwardly from their central axes and said device includes side plates rigidly connected to said test track on opposite sides thereof and having a plurality of spaced slots positioned to receive said projections for maintaining the rollers in a predetermined position relative to one another and the test section.

5. A device as claimed in claim 2 wherein said test track has a head end positioned slightly lower than the adjacent end of said one rail to prevent damage to said floating section upon the movement of a wheel from said one rail to said floating section.

6. In combination, a section of railroad track having two parallel main rails, each main rail having a gap and a floating rail section interposed and aligned in the gap inserted therein, each of said floating rail sections being positioned opposite the other, each said rail section being shorter than the gap and of such a length to permit limited longitudinal movement, a plurality of bearing means operatively positioned beneath each said floating rail section to permit relatively frictionless longitudinal movement, resilient means for each of said two parallel main rails operatively positioned between a floating rail section and each adjacent end of a main rail to urge constantly that floating rail section to a predetermined longitudinal normal position, each said resilient means having a force greater than normally required to rotate the train wheels traversing its respective floating section and a force lower than that required to rotate train wheels having harder than normal rolling characteristics, whereby both said floating rail sections are responsive to the frictional force caused by a hard rolling wheel traversing a respective floating section to move longitudinally in response to the traversing of a hard rolling wheel thereover, and means for each of said floating rail sections secured thereto and responsive to longitudinal movement thereof to detect the presence of a hard rolling wheel traversing a floating rail section.

References Cited in the file of this patent

UNITED STATES PATENTS

| | | | |
|---|---|---|---|
| 737,896 | Bellows | Sept. 1, | 1903 |
| 778,002 | Bellows | Dec. 20, | 1904 |
| 892,557 | Shafer | July 7, | 1908 |
| 1,273,660 | Patterson | July 23, | 1918 |
| 1,629,805 | McCarroll | May 24, | 1927 |
| 1,690,915 | Wenzel | Nov. 6, | 1928 |
| 1,772,391 | Evers | Aug. 5, | 1930 |
| 1,994,751 | Campbell | Mar. 19, | 1935 |
| 2,009,950 | Wells | July 30, | 1935 |
| 2,012,142 | Shroyer | Aug. 20, | 1935 |
| 2,605,392 | Gieskieng | July 29, | 1952 |
| 2,648,140 | Wilkerson | Aug. 11, | 1953 |
| 2,654,490 | Glaze | Oct. 6, | 1953 |
| 2,818,508 | Johanson | Dec. 31, | 1957 |
| 2,837,911 | Haggadone | June 10, | 1958 |
| 2,856,539 | Orthuber et al. | Oct. 14, | 1958 |
| 2,896,069 | Wight | July 21, | 1959 |

FOREIGN PATENTS

| | | | |
|---|---|---|---|
| 96,632 | Germany | Mar. 18, | 1898 |
| 348,351 | Great Britain | May 14, | 1931 |
| 644,809 | Canada | July 17, | 1962 |